(12) United States Patent
Thompson

(10) Patent No.: US 11,318,575 B2
(45) Date of Patent: May 3, 2022

(54) ADJUSTABLE FEED MECHANISMS, MACHINING ASSEMBLIES INCLUDING THE SAME, AND ASSOCIATED METHODS

(71) Applicant: Climax Portable Machine Tools, Inc., Newberg, OR (US)

(72) Inventor: Andrew Thompson, Hendersonville, NC (US)

(73) Assignee: Climax Portable Machine Tools, Inc., Newberg, OR (US)

( * ) Notice: Subject to any disclaimer, the term of this patent is extended or adjusted under 35 U.S.C. 154(b) by 432 days.

(21) Appl. No.: 16/224,618

(22) Filed: Dec. 18, 2018

(65) Prior Publication Data

US 2019/0193222 A1 Jun. 27, 2019

Related U.S. Application Data

(60) Provisional application No. 62/609,182, filed on Dec. 21, 2017.

(51) Int. Cl.
| | |
|---|---|
| *B23B 5/34* | (2006.01) |
| *B23B 3/26* | (2006.01) |
| *B23Q 5/34* | (2006.01) |
| *B23Q 16/02* | (2006.01) |
| *B23B 5/16* | (2006.01) |

(52) U.S. Cl.
CPC ............... *B23Q 5/341* (2013.01); *B23B 3/26* (2013.01); *B23B 5/162* (2013.01); *B23Q 16/024* (2013.01)

(58) Field of Classification Search
CPC .. B23B 3/26; B23B 5/162; B23B 3/22; B23Q 16/024; B23Q 5/341; Y10T 82/22; Y10T 82/2529; Y10T 82/2527; Y10T 82/16442

USPC .............................................. 82/70, 113, 130
See application file for complete search history.

(56) References Cited

U.S. PATENT DOCUMENTS

| | | | | | |
|---|---|---|---|---|---|
| 3,733,939 | A | * | 5/1973 | Paysinger | B23B 5/162 |
| | | | | | 82/113 |
| 3,807,047 | A | * | 4/1974 | Sherer | B23D 21/04 |
| | | | | | 30/97 |
| 4,819,527 | A | * | 4/1989 | Redman | B23G 1/52 |
| | | | | | 82/165 |
| 4,944,205 | A | * | 7/1990 | Ricci | B23B 3/26 |
| | | | | | 82/113 |

(Continued)

*Primary Examiner* — Sara Addisu
(74) *Attorney, Agent, or Firm* — Dascenzo Gates Intellectual Property Law, P.C.

(57) ABSTRACT

Adjustable feed mechanisms, machining assemblies including the same, and associated methods. An adjustable feed mechanism includes a plurality of cam segments and a cam lifter configured to pivot each cam segment about a corresponding cam pivot point. An adjustable feed mechanism additionally includes a cam follower and a feed output assembly. The cam follower moves along the cam segments sequentially and is pivotally coupled to the feed output assembly. The cam follower pivots through a cam activation angle when moving along a given cam segment to produce the feed output. A machining assembly includes a mount assembly, a rotary element, and an adjustable feed mechanism. A method of utilizing a machining assembly to machine a work piece includes engaging the work piece with a machining assembly, positioning the tool head with respect to the work surface of the work piece, and machining the work surface.

20 Claims, 5 Drawing Sheets

(56) References Cited

U.S. PATENT DOCUMENTS

| | | | | |
|---|---|---|---|---|
| 5,429,021 A | * | 7/1995 | Astle | B23B 3/26 |
| | | | | 82/1.3 |
| 5,826,470 A | * | 10/1998 | Tremblay | B23B 5/165 |
| | | | | 82/113 |
| 2007/0193421 A1 | * | 8/2007 | Reynolds | B23D 31/001 |
| | | | | 82/56 |

* cited by examiner

ADJUSTABLE FEED MECHANISMS, MACHINING ASSEMBLIES INCLUDING THE SAME, AND ASSOCIATED METHODS

RELATED APPLICATION

This application claims priority to U.S. Provisional Patent Application No. 62/609,182, entitled "ADJUSTABLE FEED MECHANISMS, MACHINING ASSEMBLIES INCLUDING THE SAME, AND ASSOCIATED METHODS" and which was filed on Dec. 21, 2017, the disclosure of which is hereby incorporated by reference.

FIELD

The present disclosure relates generally to adjustable feed mechanisms, machining assemblies including the same, and associated methods.

BACKGROUND

A machine tool for machining a work piece generally may be configured to move a tool along a toolpath such that the tool rotates and/or revolves with respect to the work piece (and/or vice-versa) and concurrently translates along the work piece. In this manner, the tool may move along a toolpath that covers a working area of the work piece. As examples, a lathe may translate a tool with respect to a rotating work piece, or a surfacing tool may rotate and translate a tool with respect to a stationary work piece. The tool may be translated with respect to the work piece at a feed rate that may be constant or variable. A constant feed rate may enable the toolpath to traverse the working area efficiently, but may limit the functional versatility of the machine tool. A variable feed rate may enable the machine tool to be selectively configured to operate on work pieces of various dimensions and/or geometries. However, mechanisms for achieving a variable feed rate may be bulky, expensive, and/or time-consuming to adjust. For example, a machine tool may be selectively transitioned among a discrete plurality of feed rates via selection of corresponding gear mechanisms. In such a configuration, it may be difficult or impossible to change the feed rate or stop the feed while the machine tool continues to rotate the tool with respect to the work piece.

SUMMARY

Adjustable feed mechanisms, machining assemblies including the same, and associated methods are disclosed herein. An adjustable feed mechanism is configured to produce a feed output to translate a tool of a machining assembly with respect to a rotary element of the machining assembly. An adjustable feed mechanism includes a plurality of cam segments and a cam lifter that contacts a cam lifter engagement structure of each cam segment of the plurality of cam segments. The plurality of cam segments is distributed radially about a central axis. Each cam segment includes an inner cam surface and an outer cam surface, and is configured to pivot about a corresponding cam pivot point. The cam lifter is configured to be selectively rotated about the central axis to pivot each cam segment of the plurality of cam segments about the corresponding cam pivot point. An adjustable feed mechanism additionally includes a cam follower biased toward the cam lifter and a feed output assembly configured to generate the feed output. The cam follower is configured to revolve about the central axis and to move along the outer cam surfaces of the plurality of cam segments sequentially. The cam follower is pivotally coupled to the feed output assembly. The cam follower is configured to pivot in a first pivot direction with respect to the feed output assembly when the cam follower moves away from the cam lifter and to pivot in a second pivot direction with respect to the feed output assembly when the cam follower moves toward the cam lifter such that the second pivot direction is opposite the first pivot direction. The cam follower is configured to pivot in the first pivot direction through a cam activation angle as the cam follower moves along each cam segment. The feed output assembly is configured to produce the feed output to translate the tool with respect to the rotary element when the cam follower pivots in the first pivot direction. The adjustable feed mechanism is configured to enable adjustment of the feed rate via selective rotation of the cam lifter about the central axis to adjust the cam activation angle while the cam follower revolves about the central axis.

A machining assembly for machining a work piece includes a mount assembly configured to engage the work piece, a rotary element configured to rotate with respect to the work piece, and an adjustable feed mechanism. The rotary element supports a tool head with a tool for machining a work surface of the work piece. The rotary element is configured to rotate about the central axis. The tool head is configured to translate with respect to the rotary element responsive to the feed output produced by the adjustable feed mechanism while the rotary element rotates about the central axis.

A method of utilizing a machining assembly to machine a work piece includes engaging the work piece with a machining assembly, positioning the tool head with respect to the work surface of the work piece, and machining the work surface. The machining includes rotating the rotary element about the central axis and translating the tool with respect to the rotary element.

DESCRIPTION

Figure 1:
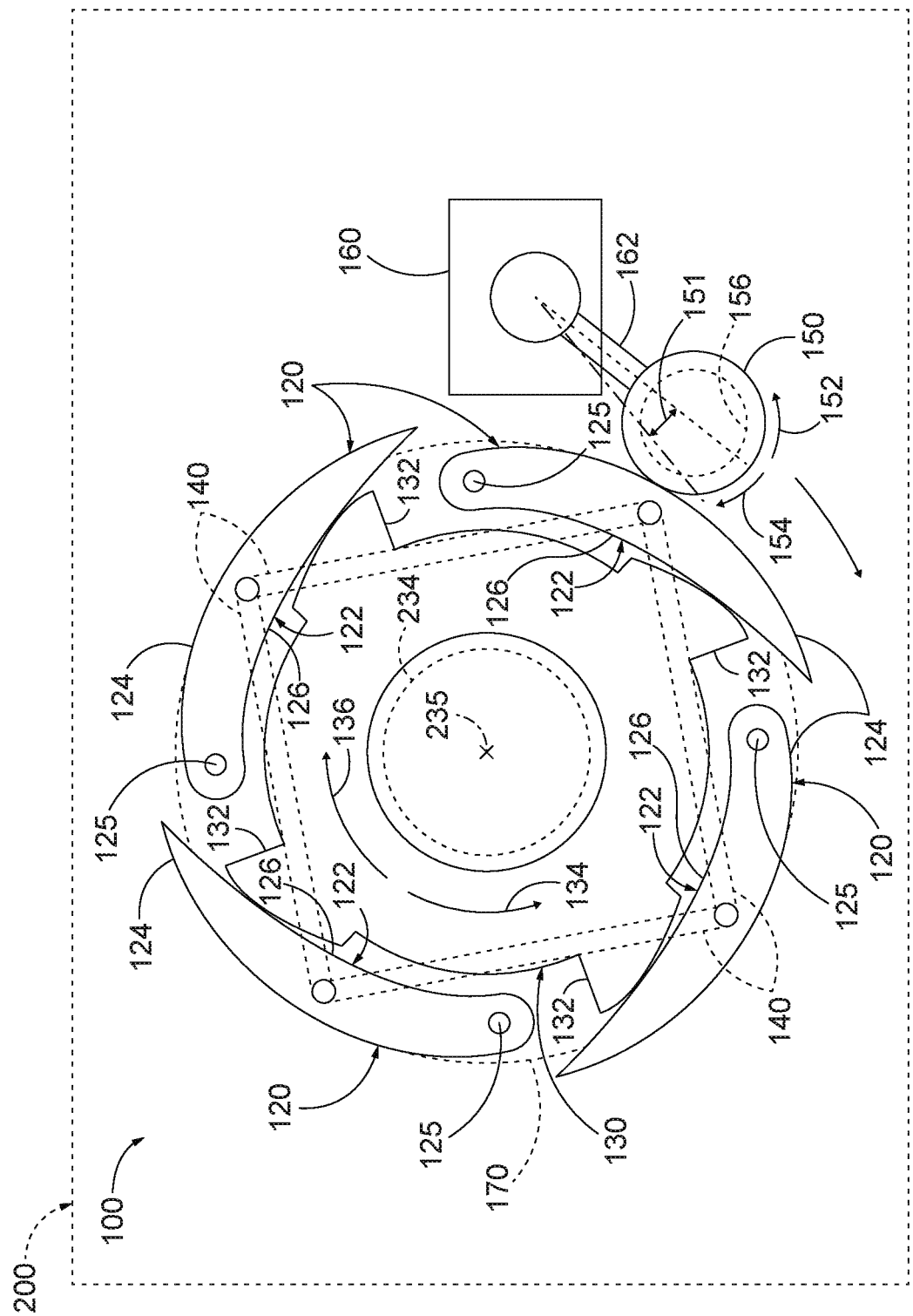
FIG. 1 is a schematic plan view illustrating examples of adjustable feed mechanisms according to the present disclosure.

FIGS. 1-6 provide examples of adjustable feed mechanisms 100, of machining assemblies 200 including adjustable feed mechanisms, and/or of methods 400 of utilizing machining assemblies that include adjustable feed mechanisms. Elements that serve a similar, or at least substantially similar, purpose are labeled with like numbers in each of FIGS. 1-6, and these elements may not be discussed herein with reference to each of FIGS. 1-6. Similarly, all elements may not be labeled in each of FIGS. 1-6, but reference numerals associated therewith may be utilized herein for consistency. Elements, components, and/or features that are discussed herein with reference to one or more of FIGS. 1-6 may be included in and/or utilized with any of FIGS. 1-6 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

FIG. 1 is a schematic top plan view of an adjustable feed mechanism 100, such as may be installed in and/or a component of a machining assembly 200. More specifically, adjustable feed mechanism 100 generally is configured to produce a feed output to translate a tool of a machining assembly 200 with respect to a rotary element of the machining assembly. For example, and as schematically illustrated in FIG. 1, adjustable feed mechanism 100 may be a component of and/or positioned within a machining assembly 200 that may include a central spindle 234 with a central axis 235.

As schematically illustrated in FIG. 1, adjustable feed mechanism 100 includes a plurality of cam segments 120 distributed radially about central axis 235 and a cam lifter 130 configured to be selectively rotated about the central axis to pivot each cam segment about a corresponding cam pivot point 125. More specifically, and as schematically illustrated in FIG. 1, each cam segment 120 includes a cam lifter engagement structure 126 such that cam lifter 130 is configured to engage the cam lifter engagement structure of each cam segment to pivot each cam segment about the corresponding cam pivot point 125. Cam lifter engagement structure 126 may include and/or be any appropriate structure. For example, and as schematically illustrated in FIG. 1, each cam segment 120 may be described as including an inner cam surface 122 and an outer cam surface 124, and the inner cam surface may include and/or be cam lifter engagement structure 126. Stated differently, in such an embodiment, cam lifter 130 may be configured to slide along inner cam surface 122 of each cam segment 120 to pivot each cam segment about the corresponding cam pivot point 125. However, this is not required to all examples of adjustable feed mechanism 100, and it is additionally within the scope of the present disclosure that cam lifter engagement structure 126 may be spaced apart from inner cam surface 122. As an example, cam lifter engagement structure 126 may correspond to and/or be a pin that extends away from a remainder of cam segment 120 along a direction at least substantially parallel to central axis 235.

As additionally schematically illustrated in FIG. 1, adjustable feed mechanism 100 further includes a cam follower 150 that is biased toward cam lifter 130 and that is configured to revolve about central axis 235 and to move along outer cam surface 124 of each cam segment 120 sequentially. Stated differently, cam follower 150 is configured to rotate relative to the plurality of cam segments 120 such that the cam follower travels along a path defined by the outer cam surfaces 124 of the cam segments. In this manner, pivoting each cam segment 120 about the corresponding cam pivot point 125 serves to vary the path followed by cam follower 150. As further schematically illustrated in FIG. 1, adjustable feed mechanism 100 additionally includes a feed output assembly 160 configured to generate the feed output based upon the path followed by cam follower 150. Cam follower 150 is pivotally coupled to feed output assembly 160. Specifically, cam follower 150 pivots in a first pivot direction 152 with respect to the feed output assembly when the cam follower moves away from cam lifter 130 and pivots in a second pivot direction 154 with respect to the feed output assembly that is opposite the first pivot direction when the cam follower moves toward the cam lifter. More specifically, cam follower 150 may pivot in first pivot direction 152 as the cam follower travels along outer cam surface 124 of a given cam segment 120 and/or may pivot in second pivot direction 154 as the cam follower travels from the outer cam surface of a given cam segment 120 to the outer cam surface of an adjacent cam segment 120. As schematically illustrated in FIG. 1, a pivotal position of cam follower 150 with respect to feed output assembly 160 may be characterized by a cam follower pivot angle 151 as measured with respect to a neutral pivotal position and along first pivot direction 152. The neutral pivotal position may correspond to a pivotal position of cam follower 150 when the cam follower is proximal cam pivot point 125 of a given cam segment 120. Stated differently, the neutral pivotal position may correspond to a pivotal position of cam follower 150 when each cam segment 120 is maximally pivoted toward central axis 235. Cam follower 150 additionally may be described as pivoting in first pivot direction 152 through a cam activation angle as the cam follower moves along outer cam surface 124 of a given cam segment 120. Additionally or alternatively, cam follower 150 may be described as pivoting in second pivot direction 154 through the cam activation angle when the cam follower moves from a given cam segment 120 to an adjacent cam segment 120. Stated differently, cam follower pivot angle 151 may be described as increasing in magnitude as cam follower 150 travels along outer cam surface 124 of a given cam segment 120. In this manner, the cam activation angle may be equal to a difference between a maximum value of the cam follower pivot angle (such as immediately prior to cam follower 150 moving from a given cam segment 120 to an adjacent cam segment 120) and a minimum value of the cam follower pivot angle (such as immediately subsequent to the cam follower moving from the given cam segment to the adjacent cam segment and/or when the cam follower is in the neutral pivot position) as the cam follower travels along the plurality of cam segments.

Cam follower 150 may be pivotally coupled to feed output assembly 160 in any appropriate manner. For example, and as schematically illustrated in FIG. 1, adjustable feed mechanism 100 may include a cam follower pivot arm 162 that pivotally couples cam follower 150 to feed output assembly 160. That is, in such an example, cam follower pivot arm 162 supports cam follower 150 and is configured to pivot with respect to feed output assembly 160 to maintain cam follower 150 in contact with the plurality of cam segments 120.

Cam follower 150 may be configured to engage the plurality of cam segments 120 in any appropriate manner. For example, cam follower 150 may be configured to move along each outer cam surface 124 without slipping relative to the outer cam surface. As a more specific example, and as schematically illustrated in FIG. 1, cam follower 150 may include a cam follower peripheral portion 156 configured to engage each outer cam surface 124 and to rotate with respect to cam follower pivot arm 162 as the cam follower moves along each outer cam surface. In this manner, as cam follower 150 moves along a given outer cam surface 124, a force of static friction between cam follower peripheral portion 156 and the given outer cam surface may serve to rotate the cam follower peripheral portion with respect to cam follower pivot arm 162 such that the cam follower peripheral portion does not slip relative to the outer cam surface. However, this is not required to all examples of adjustable feed mechanism 100, and it is additionally within the scope of the present disclosure that cam follower 150 may move along each outer cam surface 124 via a slipping and/or sliding engagement.

Feed output assembly 160 generally is configured to produce the feed output to translate the tool of machining assembly 200 with respect to the rotary element of the machining assembly when cam follower 150 pivots in first pivot direction 152. For example, as cam follower 150 travels along outer cam surface 124 of a given cam segment 120, cam follower pivot angle 151 may increase at a cam follower pivot rate, such that feed output assembly 160 translates the tool at a feed rate that is proportional to the cam follower pivot rate. Each cam segment 120 may be shaped and/or otherwise configured such that the cam follower pivot rate is at least substantially constant as cam follower 150 travels along the corresponding outer cam surface 124. In this manner, for a given position of cam lifter 130 relative to the plurality of cam segments 120, feed output assembly 160 may be configured to translate the tool at a feed rate that is at least substantially constant aside from within the time intervals necessary for cam follower 150 to transition from a given cam segment 120 to an adjacent cam segment 120. However, this is not required to all examples of feed mechanism 100, and it is additionally within the scope of the present disclosure that the cam follower pivot rate may vary as cam follower 150 travels along outer cam surface 124 of a given cam segment 120.

Adjustable feed mechanism 100 may be configured such that feed output assembly 160 does not generate the feed output when cam follower 150 pivots in second pivot direction 154 (such as when the cam follower moves from a given cam segment 120 to an adjacent cam segment 120). For example, cam follower 150 may be coupled to feed output assembly 160 via a one-way coupling such as a ratchet mechanism. However, this is not required to all examples of adjustable feed mechanism 100, and it is within the scope of the present disclosure that feed output assembly 160 additionally or alternatively may generate the feed output when cam follower 150 pivots in first pivot direction 152 (such as when the cam follower moves from a given cam segment 120 to an adjacent cam segment 120). As an example, in an embodiment in which feed output assembly 160 generates the feed output only when cam follower 150 pivots in second pivot direction 154, feed output assembly 160 may be described as generating a stepwise feed output such that the tool is translated with respect to the rotary element of machining assembly 200 via a plurality of discrete feed increments that are spaced-apart in time, each feed increment being generated when cam follower 150 pivots in second pivot direction 154 through the cam activation angle. Accordingly, in such an example, feed output assembly 160 may be characterized by a feed rate that is proportional to the magnitude of the cam activation angle and that also is proportional to a rotational velocity of cam follower 150 about central axis 235. Because the feed output is generated as a plurality of feed increments that are spaced-apart in time in such an example, the feed rate may be defined and/or averaged over any appropriate time interval that is sufficiently long to encompass a plurality of distinct feed increments. For example, the feed rate may correspond to and/or be the sum of the plurality of feed increments generated as cam follower 150 traverses a given number of cam segments 120 (such as the total number of cam segments) divided by the time interval over which the cam follower traverses the given number of cam segments.

Because the feed rate is partially based upon the magnitude of the cam activation angle, the feed rate may be selectively varied by selectively varying the cam activation angle. More specifically, adjustable feed mechanism 100 is configured such that selective rotation of cam lifter 130 about central axis 235 adjusts the feed rate of feed output assembly 160 by adjusting the cam activation angle, which in turn serves to adjust the cam follower pivot rate. Moreover, such adjustment may be performed during operation of adjustable feed mechanism 100, such as concurrent with cam follower 150 revolving about central axis 235. Stated differently, and with continued reference to FIG. 1, each cam segment 120 may be configured to pivot away from central axis 235 to increase the cam activation angle and/or the cam follower pivot rate when the cam lifter rotates about central axis 235 in a first adjustment direction 134, and to pivot toward the central axis to decrease the cam activation angle and/or the cam follower pivot rate when the cam lifter rotates about the central axis in a second adjustment direction 136 that is opposite the first adjustment direction. In this manner, adjustable feed mechanism 100 may be configured such that the cam follower pivot rate and/or the feed rate may be continuously adjustable, and/or such that the cam follower pivot rate and/or the feed rate may be adjusted while the rotary element of machining assembly 200 rotates with respect to a work piece.

Figure 2:
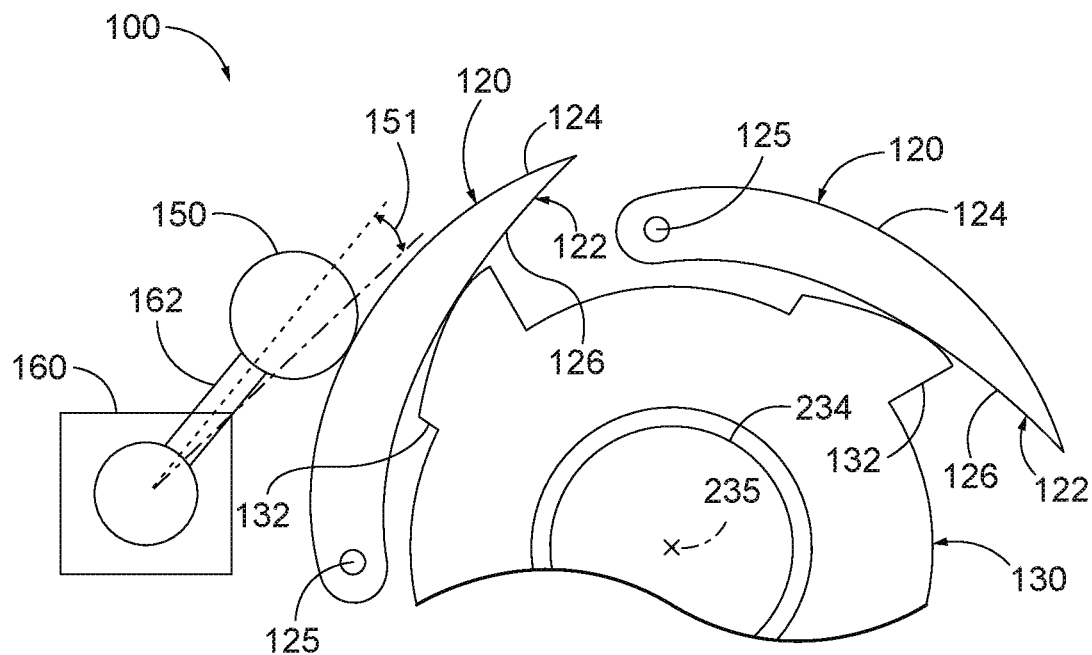
FIG. 2 is a fragmentary schematic plan view illustrating an example of an adjustable feed mechanism with a plurality of cam segments in an extended configuration.
Figure 3:
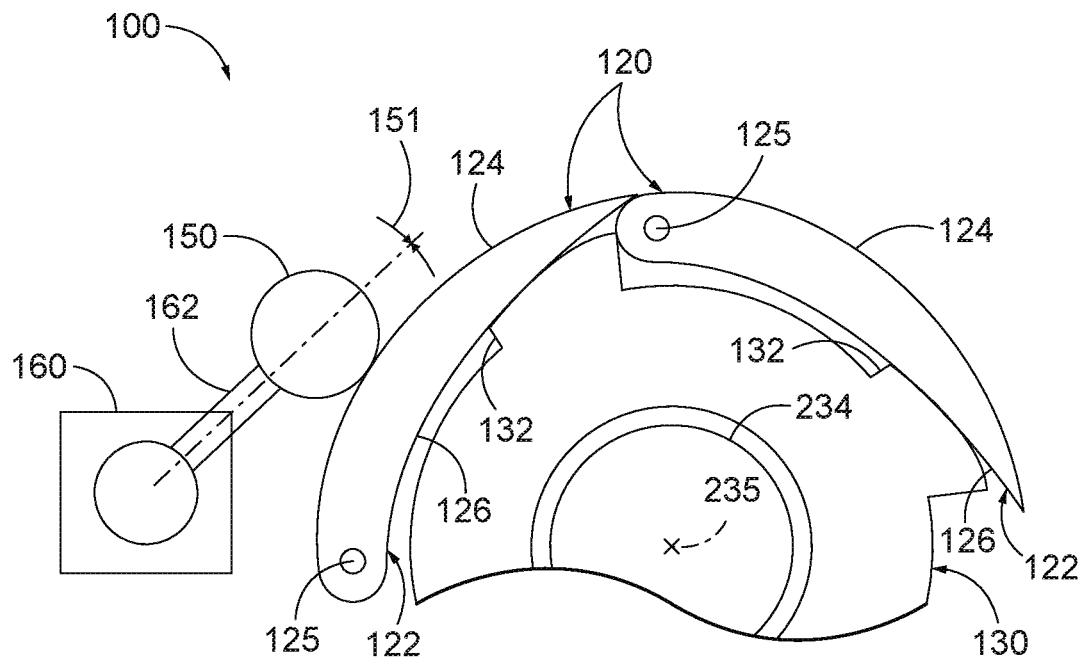
FIG. 3 is a fragmentary schematic plan view illustrating the adjustable feed mechanism of FIG. 2 with the plurality of cam segments in a retracted configuration.

Cam lifter 130 may have any appropriate shape and/or structure to facilitate the cam lifter selectively pivoting each cam segment 120. For example, and as illustrated in FIGS. 1-3, cam lifter 130 may include a plurality of tangs 132 extending radially away from central axis 235 such that each tang is configured to engage cam lifter engagement structure 126 of a corresponding cam segment 120. In this manner, the number of tangs 132 may correspond and/or be equal to the number of cam segments 120. In an example in which inner cam surface 122 includes cam lifter engagement structure 126, cam lifter 130 may be configured to pivot each cam segment 120 about the corresponding cam pivot point 125 by selectively repositioning each tang 132 along an extent of inner cam surface 122 of the corresponding cam segment, such as by rotating cam lifter 130 about central axis 235. Similarly, each cam segment 120 may have any appropriate shape for engaging cam lifter 130 and/or cam follower 150. For example, and as schematically illustrated in FIGS. 1-3, cam lifter engagement structure 126 and/or inner cam surface 122 of each cam segment 120 may be ramped and/or smoothly curved, such as to facilitate a sliding engagement between the cam lifter engagement structure and a corresponding tang 132. Additionally or alternatively, and as further schematically illustrated in FIGS. 1-3, each tang 132 may be ramped and/or smoothly curved, such as to facilitate the sliding engagement between the tang and a corresponding cam lifter engagement structure 126.

As schematically illustrated in FIG. 1, adjustable feed mechanism 100 may be configured such that the cam segments 120 of the plurality of cam segments 120 are at least substantially identical and/or such that the tangs 132 of the plurality of tangs 132 are at least substantially identical. However, this is not required to all examples of adjustable feed mechanism 100, and it is additionally within the scope of the present disclosure that at least one cam segment 120 may have a shape and/or size that differs from that of at least one other cam segment 120. Similarly, it is additionally within the scope of the present disclosure that at least one tang 132 may have a shape and/or size that differs from that of at least one other tang 132. In such embodiments, adjustable feed mechanism 100 may be configured such that, as cam lifter 130 rotates about central axis 235 in first adjustment direction 134, at least one cam segment 120 pivots away from central axis 235 at a different rate and/or by a different angular magnitude than at least one other cam segment 120. Accordingly, as cam follower 150 revolves about central axis 235, at least one feed increment may have a magnitude that differs from that of at least one other feed increment. In this manner, such an embodiment may enable precise adjustment of the feed rate, such as may be particularly beneficial in the case of relatively small feed rates.

As further schematically illustrated in FIG. 1, adjustable feed mechanism 100 additionally may include at least one return spring 140 configured to bias the plurality of cam segments toward central axis 235. As schematically illustrated in FIG. 1, each cam segment 120 may be coupled to each adjacent cam segment via a corresponding return spring 140, such that the number of return springs is equal to the number of cam segments. However, this is not required to all examples of adjustable feed mechanism 100, and it is additionally within the scope of the present disclosure that adjustable feed mechanism 100 may have any appropriate number of return springs 140. As an example, adjustable feed mechanism 100 may include a single return spring that engages each of the plurality of cam segments 120. Alternatively, adjustable feed mechanism 100 may not include return spring 140. For example, cam follower 150 may be biased toward cam lifter 130 such that the cam follower serves to bias each cam segment 120 toward central axis 235 as the cam follower revolves about the central axis.

Turning now to FIGS. 2-3, FIG. 2 schematically illustrates a portion of an example of adjustable feed mechanism 100 in which cam lifter 130 has a rotational orientation such that cam follower pivot angle 151 increases as cam follower 150 travels along outer cam surface 124 of a given cam segment 120. In this manner, FIG. 2 may be described as schematically illustrating the plurality of cam segments 120 in an extended configuration. By contrast, FIG. 3 schematically illustrates the portion of adjustable feed mechanism 100 of FIG. 2 in which cam lifter 130 has been rotated in second adjustment direction 136 (illustrated in FIG. 1) such that the plurality of cam segments 120 is maximally pivoted toward central axis 235. In this manner, FIG. 3 may be described as schematically illustrating the plurality of cam segments 120 in a retracted configuration. As illustrated in FIGS. 2-3, outer cam surface 124 of each cam segment 120 may be smoothly curved, and/or may be at least substantially a circular arc. Specifically, in the embodiment of FIGS. 2-3, at least a portion of outer cam surface 124 of each cam segment 120 has the shape of a circular arc, such that the outer cam surfaces of the plurality of cam segments collectively form a circle when each cam segment is pivoted to the neutral position. Hence, when cam lifter 130 is rotated to the position illustrated in FIG. 3, cam follower pivot angle 151 of cam follower 150 remains substantially constant as the cam follower moves along the plurality of cam segments 120, and feed output assembly 160 does not generate the feed output.

Returning to FIG. 1, adjustable feed mechanism 100 further may include a circular stop ring 170 positioned such that cam follower 150 is configured to move along the stop ring when the plurality of cam segments 120 is pivoted inwardly of the stop ring. In such an embodiment, cam follower 150 may be configured to move along at least a portion of stop ring 170 rather than along the plurality of cam segments 120 as the cam follower revolves about central axis 235 such that adjustable feed mechanism 100 does not generate the feed output. Stated differently, stop ring 170 may define a substantially circular path that cam follower 150 travels along when each cam segment 120 is pivoted toward central axis 235 to such an extent that the stop ring is distal the central axis relative to at least a portion of each cam segment.

Figure 4:
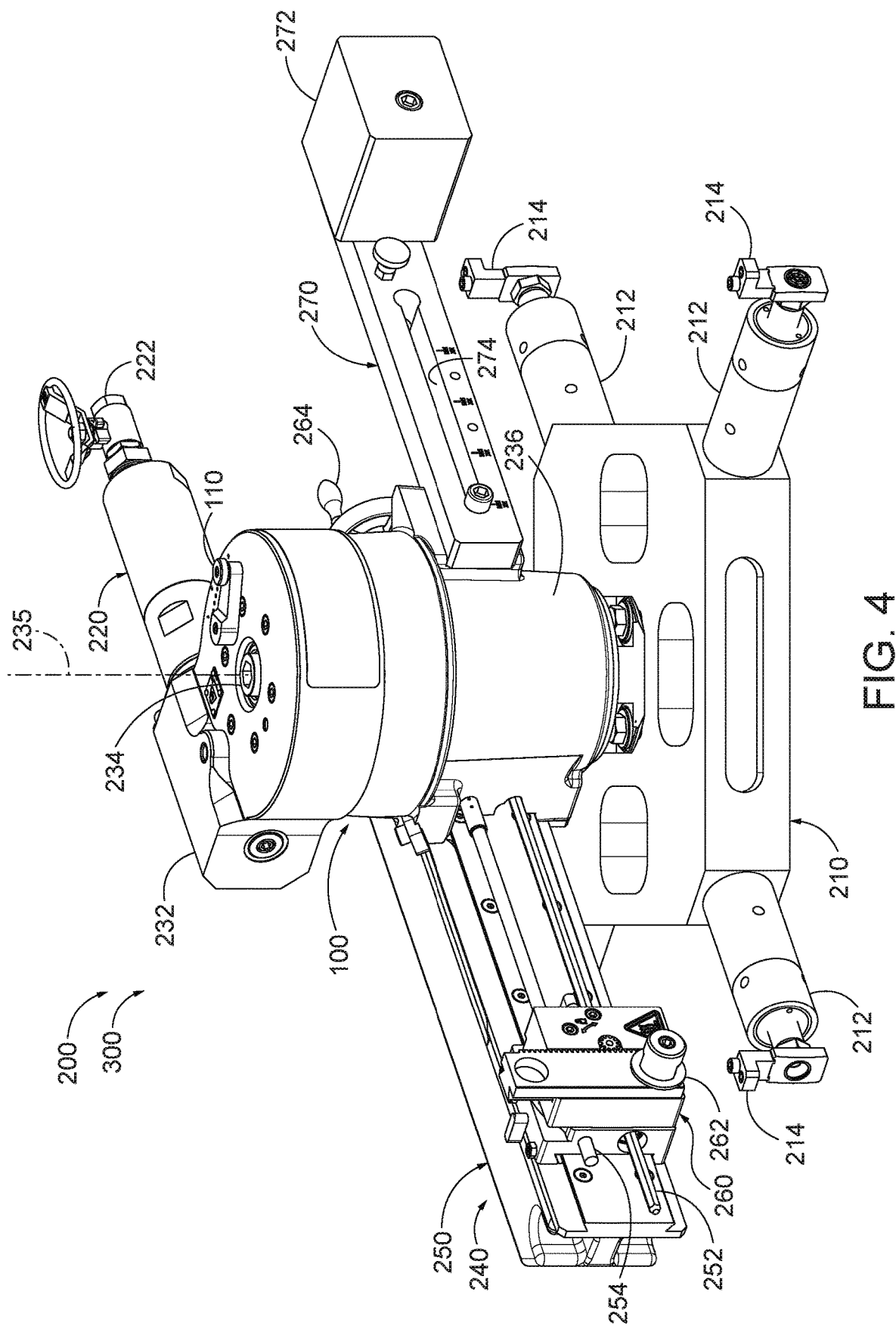
FIG. 4 is a side perspective view illustrating an example of a machining assembly that includes an adjustable feed mechanism according to the present disclosure.
Figure 5:
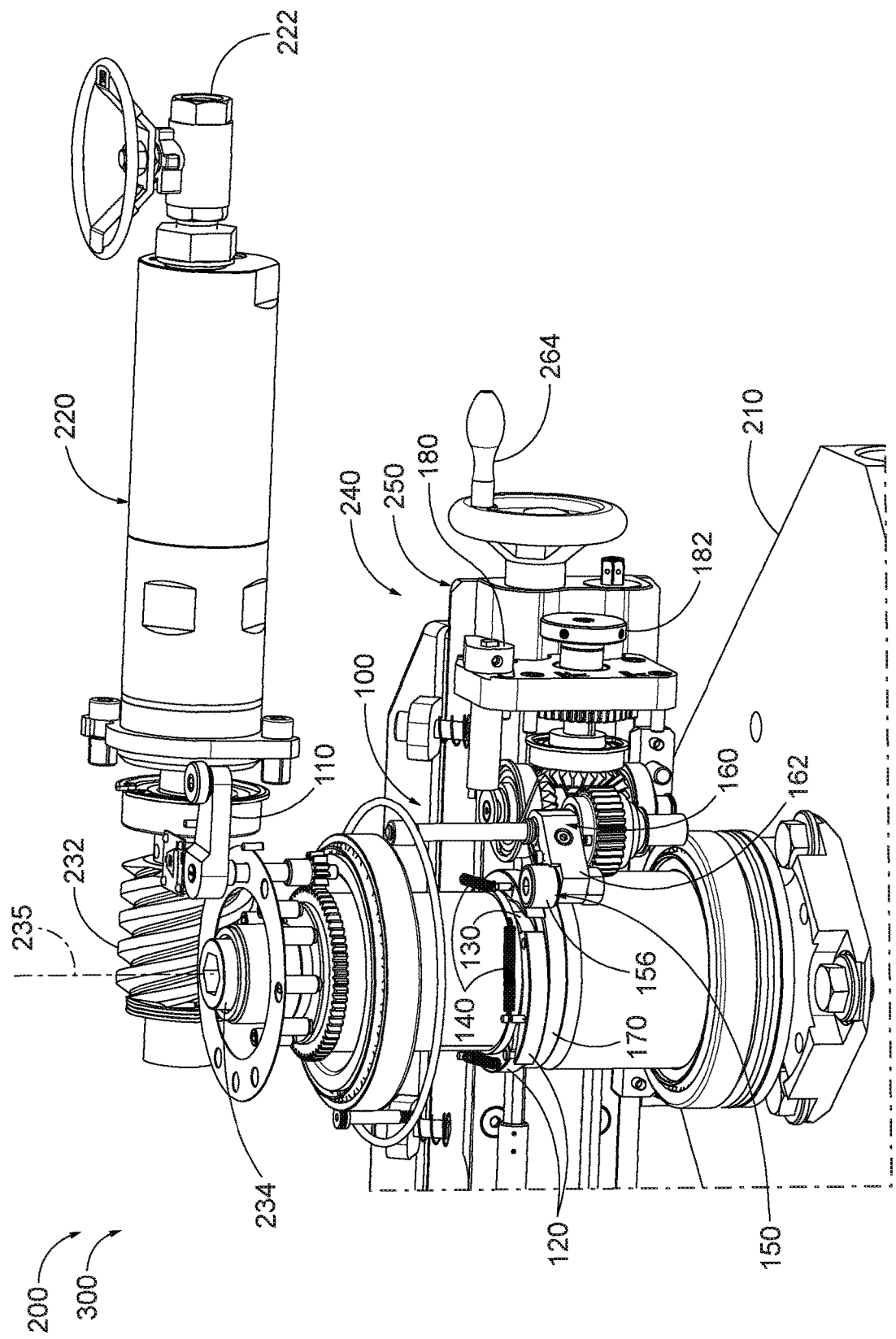
FIG. 5 is a side perspective view illustrating a portion of the machining assembly of FIG. 4.

FIGS. 4-5 are less schematic illustrations of an embodiment of machining assembly 200 that includes adjustable feed mechanism 100. Specifically, FIGS. 4-5 illustrate machining assembly 200 in the form of a flange facer 300. Flange facer 300 may be configured to be utilized in conjunction with a work piece in the form of a pipe with an open volume and an end flange, such that the flange facer is configured to machine a work surface of the end flange. As more specific examples, flange facer 300 may be configured to face the end flange, resurface the end flange, level the end flange, and/or smooth the end flange. However, this is not required, and it is additionally within the scope of the present disclosure that machining assembly 200 may include and/or be any appropriate rotary machine tool, examples of which include a facer, a boring machine, a lathe, and/or a mill. Thus, while the following discussion is presented in the context of an example of a machining assembly 200 in the form of a flange facer 300, it is to be understood that the following discussion also may apply to any machining assembly 200, as appropriate.

As illustrated in FIGS. 4-5, machining assembly 200 includes a mount assembly 210 configured to engage a work piece, a rotary element 240 configured to rotate with respect to the work piece, and adjustable feed mechanism 100. Rotary element 240 supports a tool head 260 with a tool 262 for machining a work surface of the work piece. Tool 262 may include and/or be any appropriate structure for machining a work surface of a work piece, such as a blade, a chisel, a mill, a drill, and/or a router.

Rotary element 240 is configured to rotate about central axis 235 to move tool 262 along a toolpath. Additionally, tool head 260 is configured to translate with respect to rotary element 240 responsive to the feed output produced by adjustable feed mechanism 100 while the rotary element rotates about central axis 235. In this manner, machining assembly 200 may be configured to move tool 262 along a toolpath that is at least substantially symmetric. For example, the toolpath may be at least substantially spirally symmetric. The feed output generated by adjustable feed mechanism 100 may be configured to translate tool 262 in an axial direction with respect to the work piece (i.e., a direction that is at least substantially parallel to central axis 235) and/or in a radial direction with respect to the work piece (i.e., a direction that is at least substantially perpendicular to the central axis and/or to the axial direction).

As illustrated in FIG. 4, mount assembly 210 may include a plurality of legs 212 configured to engage the work piece. For example, in an embodiment in which the work piece includes a pipe with an open volume, mount assembly 210 may be configured to extend at least partially within the open volume of the pipe, and each leg 212 may be configured to engage an interior surface of the pipe. Mount assembly 210 may include any appropriate number of legs 212, such as two legs, three legs, four legs, five legs, six legs, and/or more than six legs. Each leg 212 may be fixedly coupled to a remainder of mount assembly 210, or may be configured to be selectively and repeatedly coupled to and removed from another portion of the mount assembly. Each leg 212 may engage the work piece in any appropriate manner. For example, each leg 212 may include a jack configured to selectively extend to engage the work piece. As another example, and as illustrated in FIG. 4, each leg 212 may include a setup finger 214 configured to engage a corner of the work piece while machining assembly 200 is positioned with respect to the work piece. In such an example, each setup finger 214 may be configured to disengage from the work piece prior to machining the work piece with machining assembly 200. Stated differently, each setup finger 214 may be configured to facilitate alignment of mount assembly 210 and/or machining assembly 200 with respect to the work piece, and may be configured to be removed from the mount assembly and/or the work piece prior to machining the work piece.

With continued reference to FIGS. 4-5, machining assembly 200 may be configured to rotate rotary element 240 about central axis 235 in any appropriate manner. For example, and as discussed above in the context of FIG. 1, machining assembly 200 may include central spindle 234 extending along central axis 235. In such an example, central spindle 234 may be configured to remain at least substantially fixed with respect to the work piece when the machining assembly machines the work piece, and rotary element 240 may be configured to rotate with respect to and/or revolve around the central spindle.

As illustrated in FIG. 4, machining assembly 200 additionally may include an outer housing 236 that at least partially encloses adjustable feed mechanism 100. At least a portion of outer housing 236 may be configured to rotate with respect to central spindle 234. FIG. 5 displays machining assembly 200 with outer housing 236 removed to illustrate adjustable feed mechanism 100 in the context of machining assembly 200. As best seen in FIG. 5, adjustable feed mechanism 100 and/or machining assembly 200 may be configured such that rotation of rotary element 240 about central axis 235 also serves to move cam follower 150 along each of the plurality of cam segments 120. Thus, the plurality of cam segments 120 and/or cam lifter 130 may be configured to remain at least substantially stationary with respect to central spindle 234 while rotary element 240 rotates with respect to the central spindle, aside from any concurrent manual adjustment of a rotational orientation of the cam lifter. Feed output assembly 160 may include any appropriate mechanism for conveying the feed output to rotary element 240, examples of which include a gear, a bevel gear, a driver gear, a spur gear, a worm gear, a gear box, a ratchet, and/or a cam shaft. As an example, FIG. 5 illustrates an embodiment in which the feed output is conveyed to rotary element 240 via an assembly that includes spur gears and bevel gears in conjunction with a ratchet mechanism.

As further illustrated in FIGS. 4-5, machining assembly 200 may include a motor 220 configured to rotate rotary element 240 about central axis 235. Motor 220 may include and/or be any appropriate motor for rotating rotary element 240. As examples, motor 220 may include and/or be a pneumatic motor and/or a hydraulic motor, such as may include an inlet 222 configured to receive a working fluid to drive the motor. Additionally or alternatively, motor 220 may be configured to generate a drive torque, and machining assembly 200 further may include a gear box 232 configured to receive the drive torque to rotate rotary element 240. Machining assembly 200 may be configured such that motor 220 does not rotate with respect to central spindle 234 and/or the work piece when the machining assembly machines the work piece.

As further illustrated in FIGS. 4-5, rotary element 240 may include and/or be a tool arm 250 that extends at least substantially perpendicular to central axis 235. Tool arm 250 may be configured to support and/or move tool head 260 and/or tool 262 in any appropriate manner. For example, and as best illustrated in FIG. 4, tool arm 250 may include a radial feed shaft 252 configured to translate tool head 260 in a radial direction with respect to the work piece and/or an axial feed shaft 254 configured to translate the tool head in an axial direction with respect to the work piece. Additionally or alternatively, tool head 260 may be configured to be selectively rotated with respect to rotary element 240, such as to adjust an angle of tool 262 with respect to the work piece.

As illustrated in FIG. 4, machining assembly 200 additionally may include a counterweight arm 270 extending generally opposite rotary element 240. For example, rotary element 240 may extend from a remainder of machining assembly 200 in such a manner that the rotary element exerts a torque on the remainder of the machining assembly, and counterweight arm 270 may extend from the remainder of the machining assembly so as to at least substantially offset and/or balance the torque exerted by the rotary element. In such an example, and as illustrated in FIG. 4, counterweight arm 270 may include a torque adjustment mechanism 274 for selectively adjusting a torque exerted by the counterweight arm upon a remainder of machining assembly 200. As a more specific example, and as further illustrated in FIG. 4, counterweight arm 270 may include a counterweight 272 that is supported relative to central axis 235, and torque adjustment mechanism 274 may be configured to selectively vary a distance between the central axis and the counterweight.

Machining assembly 200 may be configured to receive a manual input from a user in any appropriate manner. As an example, and as illustrated in FIGS. 4-5, adjustable feed mechanism 100 and/or machining assembly 200 may include a feed adjustment actuator 110 configured to receive a manual input from an operator to adjust the feed rate. More specifically, feed adjustment actuator 110 may be configured to selectively rotate cam lifter 130 about central axis 235 responsive to an external manual input from a human user. Feed adjustment actuator 110 may include and/or be any appropriate mechanism for receiving the external input, such as a crank, a dial, a knob, and/or a slider. Feed adjustment actuator 110 may be configured and/or positioned to facilitate operation of the feed adjustment actuator while rotary element 240 rotates about central axis 235. For example, feed adjustment actuator 110 may be positioned on a portion of machining assembly 200 that is not configured to rotate with respect to central spindle 234 while machining assembly 200 works the work piece.

As additional examples of user input mechanisms, and as illustrated in FIG. 5, adjustable feed mechanism 100 and/or machining assembly 200 may include a feed direction selector 180 configured to enable selection of a direction in which tool head 260 translates with respect to rotary element 240 responsive to receiving the feed output. For example, feed direction selector 180 may be configured to selectively alternate between translating tool head 260 radially outward or radially inward with respect to rotary element 240. As another example, feed direction selector 180 may be configured to selectively alternate between axially translating tool head 260 in a first axial direction with respect to rotary element 240 or in a second axial direction with respect to the rotary element that is opposite the first axial direction. As used herein, axial translation refers to translation in a direction that is at least substantially parallel to central axis 235.

As another example of a user input mechanism, and as further illustrated in FIG. 5, adjustable feed mechanism 100 may include a feed axis selector 182 configured to enable selection between a radial feed mode, in which tool head 260 translates in a radial direction with respect to rotary element 240, and an axial feed mode, in which the tool head translates in an axial direction with respect to the rotary element. In an embodiment in which rotary element 240 includes radial feed shaft 252 and axial feed shaft 254, feed axis selector 182 may serve to selectively transition feed output assembly 160 between rotating the radial tool shaft (in the radial feed mode) and the axial tool shaft (in the axial feed mode). As an additional example of a user input mechanism, rotary element 240 further may include a manual feed input 264 (best illustrated in FIG. 5) configured to be actuated by a human user to selectively translate tool head 260 with respect to rotary element 240. In this manner, an input via manual feed input 264 may selectively replace and/or supplement the feed output generated by adjustable feed mechanism 100.

Figure 6:
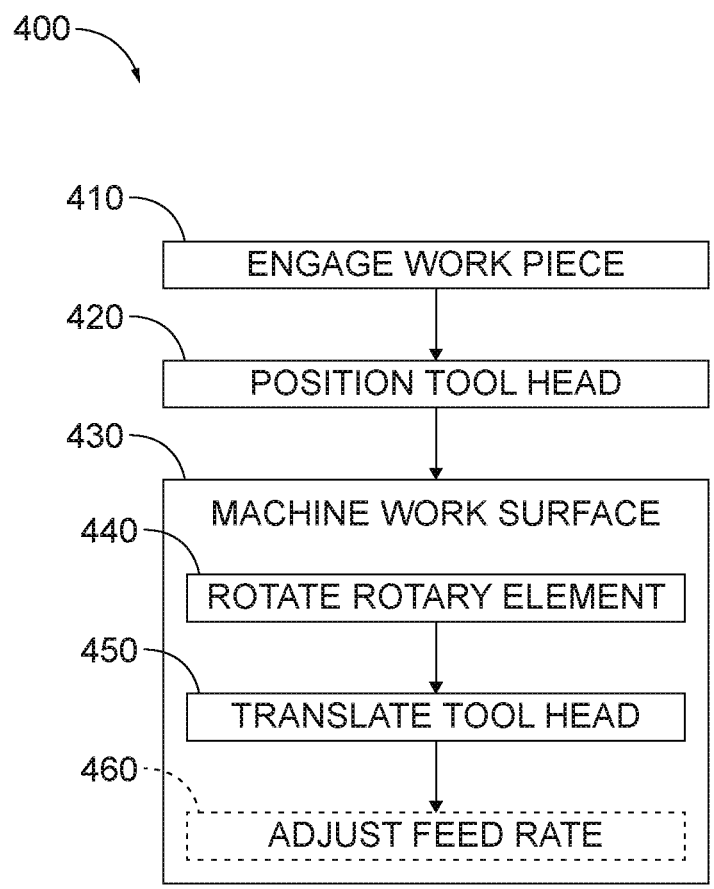
FIG. 6 is a flowchart depicting methods, according to the present disclosure, of utilizing a machining assembly.

FIG. 6 is a flowchart depicting methods 400, according to the present disclosure, of utilizing a machining assembly (such as machining assembly 200 and/or flange facer 300) to machine a work piece. Methods 400 include engaging, at 410, the work piece with the machining assembly; positioning, at 420, a tool head (such as tool head 260) with respect to a work surface of the work piece; and machining, at 430, the work surface. The machining at 430 includes rotating, at 440, a rotary element (such as rotary element 240) about a central axis (such as central axis 235) and translating, at 450, the tool head with respect to the rotary element. The machining at 430 additionally may include adjusting, at 460, an adjustable feed mechanism (such as adjustable feed mechanism 100) to adjust a feed rate at which the tool head is translated with respect to the rotary element. The machining at 430 further may include facing the work surface, milling the work surface, resurfacing the work surface, leveling the work surface, and/or smoothing the work surface.

The engaging at 410 may include positioning a mount assembly (such as mount assembly 210) at least partially within the work piece. The mount assembly may include a plurality of legs (such as legs 212) configured to engage the work piece, and the engaging at 410 may include engaging the work piece with each of the plurality of legs. In such an embodiment, each leg may include a jack, and the engaging at 410 further may include engaging the work piece with each jack. Additionally or alternatively, each leg may include a setup finger (such as setup finger 214), and the engaging at 410 may include engaging the work piece with each setup finger. In such an embodiment, the engaging at 410 further may include disengaging each setup finger from the work piece prior to operating the machining assembly.

The positioning at 420 may include positioning the tool head along a rotary element (such as rotary element 240) such that the tool head is positioned distal the central axis, and the subsequent translating at 450 may include translating the tool head toward the central axis. Alternatively, the positioning at 420 may include positioning the tool head along the rotary element such that the tool head is positioned proximal the central axis, and the subsequent translating at 450 may include translating the tool head away from the central axis. Additionally or alternatively, the positioning at 420 may include rotating the tool head with respect to the rotary element to position the tool head at a predetermined angle with respect to the work surface of the work piece.

As discussed, the machining at 430 includes the rotating at 440 and the translating at 450. More specifically, the translating at 450 may be performed at least partially concurrently with the rotating at 440. For example, the rotating at 440 may include rotating the rotary element about the central axis at a substantially constant rate, and the translating at 450 may include translating the tool head at a feed rate that is at least substantially constant. For example, the feed rate may be proportional to a cam follower pivot rate corresponding to a rate at which a cam follower pivot angle (such as cam follower pivot angle 151) increases as a cam follower (such as cam follower 150) travels along the outer surface of each of a plurality of cam segments (such as outer cam surfaces 124 of cam segments 120).

The rotating at 440 may include rotating responsive to any appropriate force and/or input. For example, the rotating at 440 may include driving a motor (such as motor 220) with a working fluid. Additionally or alternatively, the rotating at 440 may include generating a drive torque with the motor and transmitting the drive torque to the rotary element via a gear box (such as gear box 232).

The translating at 450 may include translating the tool head in any appropriate direction. As examples, the translating at 450 may include translating the tool head in a radial direction with respect to the work piece, and/or may include translating the tool head in an axial direction with respect to the work piece.

The adjusting at 460 may be performed prior to the rotating at 440, and/or may be performed concurrently with the rotating at 440. The adjusting at 460 may include receiving an external input via a feed adjustment actuator (such as feed adjustment actuator 110). The adjusting at 460 may adjust the feed rate in any appropriate manner. For example, the adjusting at 460 may include adjusting a magnitude of a feed rate by which the tool head is translated during the translating at 450, such as by adjusting a cam follower pivot rate and/or a cam activation angle of the adjustable feed mechanism. Additionally or alternatively, the adjusting at 460 may include adjusting a rotational velocity of the rotary element about the central axis. In an embodiment in which the adjusting at 460 is performed concurrently with the rotating at 440, the adjusting further may include reducing a magnitude of the feed rate to zero as the tool head approaches a boundary of the work surface and concurrently with the rotating at 440. Stated differently, the machining at 430 may include adjusting, at 460, the feed rate of the tool head such that the tool head gradually approaches the boundary of the work surface without extending beyond the boundary.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It also is within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/ or methods, are also within the scope of the present disclosure.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

Illustrative, non-exclusive examples of adjustable feed mechanisms, machining assemblies, and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. An adjustable feed mechanism configured to produce a feed output to translate a tool of a machining assembly with respect to a rotary element of the machining assembly, the adjustable feed mechanism comprising:

a plurality of cam segments distributed radially about a central axis, wherein each cam segment includes an inner cam surface, an outer cam surface, and a cam lifter engagement structure, and wherein each cam segment is configured to pivot about a corresponding cam pivot point;

a cam lifter that contacts the cam lifter engagement structure of each cam segment of the plurality of cam segments; wherein the cam lifter is configured to be selectively rotated about the central axis relative to the plurality of cam segments to pivot each cam segment of the plurality of cam segments about the corresponding cam pivot point;

a cam follower biased toward the cam lifter and configured to revolve about the central axis and to move along the outer cam surfaces of the plurality of cam segments sequentially; and a feed output assembly configured to generate the feed output;

wherein the cam follower is pivotally coupled to the feed output assembly; wherein the cam follower is configured to pivot in a first pivot direction with respect to the feed output assembly when the cam follower moves away from the cam lifter; wherein the cam follower is configured to pivot in a second pivot direction with respect to the feed output assembly when the cam follower moves toward the cam lifter; wherein the second pivot direction is opposite the first pivot direction; wherein the cam follower is configured to pivot in the first pivot direction through a cam activation angle as the cam follower travels along the outer cam surface of a given cam segment of the plurality of cam segments; wherein the cam follower is configured to pivot in the second pivot direction through the cam activation angle when the cam follower moves from the given cam segment to an adjacent cam segment; wherein the feed output assembly is configured to produce the feed output to translate the tool with respect to the rotary element responsive to the cam follower pivoting in the first pivot direction; and wherein the adjustable feed mechanism is configured to enable adjustment of a feed rate of the feed output via selective rotation of the cam lifter about the central axis relative to the plurality of cam segments to adjust the cam activation angle while the cam follower revolves about the central axis.

A2. The adjustable feed mechanism of paragraph A1, wherein the inner cam surface of each cam segment includes, and optionally is, the cam lifter engagement structure.

A3. The adjustable feed mechanism of paragraph A1, wherein the cam lifter engagement structure of each cam segment is spaced apart from the inner cam surface of the cam segment.

A4. The adjustable feed mechanism of any of paragraphs A1-A3, wherein each cam segment is configured to pivot away from the central axis to increase the cam activation angle when the cam lifter rotates about the central axis in a first adjustment direction, and wherein each cam segment is configured to pivot toward the central axis to decrease the cam activation angle when the cam lifter rotates about the central axis in a second adjustment direction that is opposite the first adjustment direction.

A5. The adjustable feed mechanism of any of paragraphs A1-A4, wherein a pivotal position of the cam follower with respect to the feed output assembly is characterized by a cam follower pivot angle, as measured with respect to a neutral pivotal position and along the first pivot direction, and wherein the cam activation angle is equal to a difference between a maximum value of the cam follower pivot angle and a minimum value of the cam follower pivot angle as the cam follower travels along the plurality of cam segments.

A6. The adjustable feed mechanism of any of paragraphs A1-A5, wherein, as the cam follower travels along the outer cam surface of a given cam segment of the plurality of cam segments, the cam follower pivot angle increases at a cam follower pivot rate, and wherein the feed rate is at least substantially proportional to a magnitude of the cam follower pivot rate.

A7. The adjustable feed mechanism of paragraph A6, wherein the cam follower pivot rate is at least substantially constant as the cam follower travels along the outer cam surface of the given cam segment.

A8. The adjustable feed mechanism of any of paragraphs A1-A7, wherein the feed rate is proportional to a magnitude of the cam activation angle.

A9. The adjustable feed mechanism of any of paragraphs A1-A8, wherein the feed output assembly is not configured to generate the feed output when the cam follower pivots in the second pivot direction.

A10. The adjustable feed mechanism of any of paragraphs A1-A9, wherein the cam follower is coupled to the feed output assembly via a ratchet mechanism.

A11. The adjustable feed mechanism of any of paragraphs A1-A10, wherein the adjustable feed mechanism further includes at least one return spring configured to bias the plurality of cam segments toward the central axis.

A12. The adjustable feed mechanism of any of paragraphs A1-A11, wherein the inner cam surface of each cam segment is ramped.

A13. The adjustable feed mechanism of any of paragraphs A1-A12, wherein the inner cam surface of each cam segment is smoothly curved.

A14. The adjustable feed mechanism of any of paragraphs A1-A13, wherein the outer cam surface of each cam segment is smoothly curved.

A15. The adjustable feed mechanism of any of paragraphs A1-A14, wherein the outer cam surface of each cam segment is at least substantially a circular arc.

A16. The adjustable feed mechanism of any of paragraphs A1-A15, wherein at least one cam segment of the plurality of cam segments has a shape that differs from that of at least one other cam segment of the plurality of cam segments.

A17. The adjustable feed mechanism of any of paragraphs A1-A16, wherein the cam lifter includes a plurality of tangs, wherein each tang is configured to engage the cam lifter engagement structure of a corresponding cam segment of the plurality of cam segments to selectively pivot the corresponding cam segment about the corresponding cam pivot point when the cam lifter rotates about the central axis.

A18. The adjustable feed mechanism of paragraph A17, wherein each tang of the plurality of tangs has an outer surface that is one or more of ramped and smoothly curved.

A19. The adjustable feed mechanism of any of paragraphs A17-A18, wherein at least one tang of the plurality of tangs has a shape that differs from that of at least one other tang of the plurality of tangs.

A20. The adjustable feed mechanism of any of paragraphs A1-A19, wherein the cam follower is configured to move along each outer cam surface without slipping relative to the outer cam surface.

A21. The adjustable feed mechanism of any of paragraphs A1-A20, further comprising a cam follower pivot arm that pivotally couples the cam follower to the feed output assembly.

A22. The adjustable feed mechanism of paragraph A21, wherein the cam follower includes a cam follower peripheral portion configured to engage the outer cam surface of each cam segment of the plurality of cam segments and to rotate with respect to the cam follower pivot arm as the cam follower moves along each outer cam surface.

A23. The adjustable feed mechanism of any of paragraphs A1-A22, wherein the plurality of cam segments is configured such that the outer cam surfaces of each of the plurality of cam segments collectively form a continuous surface, optionally a continuous circle, when each cam segment of the plurality of cam segments is pivoted to a retracted position.

A24. The adjustable feed mechanism of paragraph A23, wherein the adjustable feed mechanism is configured to revolve the cam follower about the central axis without producing the feed output when the plurality of cam segments is pivoted to the retracted position.

A25. The adjustable feed mechanism of any of paragraphs A1-A24, further comprising a circular stop ring, wherein the cam follower is configured to move along the stop ring when the plurality of cam segments is pivoted inwardly of the stop ring.

A26. The adjustable feed mechanism of paragraph A25, wherein the adjustable feed mechanism is configured to revolve the cam follower about the central axis without producing the feed output when the cam follower moves along the stop ring.

A27. The adjustable feed mechanism of any of paragraphs A1-A26, further comprising a feed adjustment actuator configured to receive an input to adjust the feed rate.

A28. The adjustable feed mechanism of paragraph A27, wherein the feed adjustment actuator is configured to rotate the cam lifter about the central axis responsive to an external input.

A29. The adjustable feed mechanism of any of paragraphs A27-A28, wherein the feed adjustment actuator includes at least one of a crank, a dial, a knob, and a slider.

A30. The adjustable feed mechanism of any of paragraphs A1-A29, further comprising a feed axis selector configured to enable selection between a radial feed mode, in which a tool head translates in a radial direction with respect to a work piece, and an axial feed mode, in which the tool head translates in an axial direction with respect to the work piece.

A31. The adjustable feed mechanism of any of paragraphs A1-A30, further comprising a feed direction selector configured to enable selection of a direction in which the tool head translates with respect to the work piece.

A32. The adjustable feed mechanism of any of paragraphs A1-A31, wherein the feed output assembly is configured to rotate at least one of a radial feed shaft and an axial feed shaft.

A33. The adjustable feed mechanism of any of paragraphs A1-A32, wherein the feed output assembly includes at least one of a gear, a bevel gear, a driver gear, a spur gear, a worm gear, a gear box, a ratchet, and a cam shaft.

B1. A machining assembly for machining a work piece, the machining assembly comprising:
 a mount assembly configured to engage the work piece;
 a rotary element configured to rotate with respect to the work piece; and
 the adjustable feed mechanism of any of paragraphs A1-A33;
 wherein the rotary element supports a tool head with a tool for machining a work surface of the work piece; wherein the rotary element is configured to rotate about the central axis; wherein the tool head is configured to translate with respect to the rotary element responsive to the feed output produced by the adjustable feed mechanism while the rotary element rotates about the central axis.

B2. The machining assembly of paragraph B1, wherein the machining assembly is configured to move the tool along a toolpath on the work surface of the work piece that is at least substantially symmetric.

B3. The machining assembly of paragraph B2, wherein the toolpath is at least substantially spirally symmetric.

B4. The machining assembly of any of paragraphs B1-B3, wherein the feed output is configured to translate the tool in at least one of a radial direction and an axial direction with respect to the work piece.

B5. The machining assembly of any of paragraphs B1-B4, further comprising at least one of a facer, a flange facer, a boring machine, a lathe, and a mill.

B6. The machining assembly of any of paragraphs B1-B5, wherein the mount assembly includes a plurality of legs configured to engage the work piece.

B7. The machining assembly of paragraph B6, wherein the plurality of legs includes one of two legs, three legs, four legs, five legs, six legs, and more than six legs.

B8. The machining assembly of any of paragraphs B6-B7, wherein each leg of the plurality of legs includes a jack configured to selectively extend to engage the work piece.

B9. The machining assembly of any of paragraphs B6-B8, wherein each leg of the plurality of legs is fixedly coupled to a remainder of the mount assembly.

B10. The machining assembly of any of paragraphs B6-B8, wherein each leg of the plurality of legs is configured to be selectively and repeatedly coupled to and removed from another portion of the mount assembly.

B11. The machining assembly of any of paragraphs B6-B10, wherein each leg of the plurality of legs includes a corresponding setup finger configured to engage a corner of the work piece while the machining assembly is positioned with respect to the work piece, and wherein each setup finger is configured to disengage from the work piece prior to machining the work piece with the machining assembly.

B12. The machining assembly of any of paragraphs B1-B11, wherein the work piece includes a pipe with an open volume and an end flange.

B13. The machining assembly of paragraph B12, wherein the mount assembly is configured to extend at least partially within the open volume of the pipe.

B14. The machining assembly of any of paragraphs B12-13, wherein the end flange includes the work surface.

B15. The machining assembly of any of paragraphs B12-B14, wherein the machining assembly is configured to at least one of face the end flange, resurface the end flange, level the end flange, and smooth the end flange.

B16. The machining assembly of any of paragraphs B1-B15, further comprising a central spindle that is fixedly coupled to the mount assembly.

B17. The machining assembly of paragraph B16, wherein the rotary element is configured to rotate with respect to the central spindle.

B18. The machining assembly of any of paragraphs B1-B17, wherein the machining assembly includes an outer housing that at least partially encloses the adjustable feed mechanism.

B19. The machining assembly of paragraph B18, when dependent from paragraph B16, wherein at least a portion of the outer housing is configured to rotate with respect to the central spindle.

B20. The machining assembly of any of paragraphs B1-B19, further comprising a motor configured to rotate the rotary element about the central axis.

B21. The machining assembly of paragraph B20, wherein the motor includes at least one of a pneumatic motor and a hydraulic motor.

B22. The machining assembly of any of paragraphs B20-B21, wherein the motor includes an inlet configured to receive a working fluid to drive the motor.

B23. The machining assembly of any of paragraphs B20-B22, wherein the motor is configured to generate a drive torque, and wherein the machining assembly includes a gear box configured to receive the drive torque to rotate the rotary element.

B24. The machining assembly of any of paragraphs B1-B23, wherein the rotary element includes a tool arm that extends at least substantially perpendicular to the central axis.

B25. The machining assembly of paragraph B24, wherein the tool arm includes at least one of a/the radial feed shaft configured to translate the tool head in a radial direction with respect to the work piece and an/the axial feed shaft configured to translate the tool head in an axial direction with respect to the work piece.

B26. The machining assembly of any of paragraphs B1-B25, wherein the rotary element includes a manual feed input configured to be actuated by a human user to translate the tool head with respect to the rotary element.

B27. The machining assembly of any of paragraphs B1-B26, wherein the tool head is configured to be selectively rotated with respect to the rotary element.

B28. The machining assembly of any of paragraphs B1-B27, wherein the tool includes at least one of a blade, a chisel, a mill, a drill, and a router.

B29. The machining assembly of any of paragraphs B1-B28, further comprising a counterweight arm extending generally opposite the rotary element.

B30. The machining assembly of paragraph B29, wherein the counterweight arm is configured to at least substantially balance a torque exerted on a remainder of the machining assembly by the rotary element.

B31. The machining assembly of paragraph B30, wherein the counterweight arm includes a torque adjustment mechanism for selectively adjusting a torque exerted by the counterweight arm upon a remainder of the machining assembly.

B32. The machining assembly of paragraph B31, wherein the counterweight arm includes a counterweight that is supported relative to the central axis, and wherein the torque adjustment mechanism is configured to selectively vary a distance between the central axis and the counterweight.

C1. A method of utilizing a machining assembly to machine a work piece, the method comprising:
engaging the work piece with the machining assembly of any of paragraphs B1-B32; positioning the tool head with respect to the work surface of the work piece; and
machining the work surface;
wherein the machining includes:
rotating the rotary element about the central axis; and
translating the tool with respect to the rotary element.

C2. The method of paragraph C1, wherein the engaging includes positioning the mount assembly at least partially within the work piece.

C3. The method of any of paragraphs C1-C2, wherein the mount assembly further includes a/the plurality of legs configured to engage the work piece; wherein each leg of the plurality of legs includes a/the corresponding setup finger; and wherein the engaging includes engaging the work piece with each setup finger.

C4. The method of paragraph C3, wherein the engaging further includes disengaging each setup finger from the work piece prior to the rotating.

C5. The method of any of paragraphs C1-C4, wherein the mount assembly further includes a/the plurality of legs configured to engage the work piece; wherein each leg of the plurality of legs includes a/the jack; and wherein the engaging further includes engaging the work piece with each jack.

C6. The method of any of paragraphs C1-C5, wherein the positioning includes positioning the tool head along the rotary element such that the tool head is positioned distal the central axis, and wherein the translating includes translating the tool head toward the central axis.

C7. The method of any of paragraphs C1-C6, wherein the positioning includes positioning the tool head along the rotary element such that the tool head is positioned proximal the central axis, and wherein the translating includes translating the tool head away from the central axis.

C8. The method of any of paragraphs C1-C7, wherein the positioning includes rotating the tool head with respect to the rotary element to position the tool head at a predetermined angle with respect to the work surface.

C9. The method of any of paragraphs C1-C8, wherein the machining includes at least one of facing the work surface, milling the work surface, resurfacing the work surface, leveling the work surface, and smoothing the work surface.

C10. The method of any of paragraphs C1-C9, wherein the rotating includes driving a/the motor with a/the working fluid.

C11. The method of any of paragraphs C1-C10, wherein the motor is configured to generate a drive torque, and wherein the rotating includes transmitting the drive torque to the rotary element via a/the gear box.

C12. The method of any of paragraphs C1-C11, wherein the translating is performed at least partially concurrently with the rotating.

C13. The method of any of paragraphs C1-C12, wherein the translating includes translating the tool head in a radial direction with respect to the work piece.

C14. The method of any of paragraphs C1-C13, wherein the translating includes translating the tool head in an axial direction with respect to the work piece.

C15. The method of any of paragraphs C1-C14, wherein the translating includes translating the tool head at a feed rate that is at least substantially constant.

C16. The method of any of paragraphs C1-C15, wherein the machining further includes adjusting the adjustable feed mechanism to adjust a/the feed rate at which the tool head is translated with respect to the rotary element.

C17. The method of paragraph C16, wherein the adjusting is performed prior to the rotating.

C18. The method of any of paragraphs C16-C17, wherein the adjusting is performed concurrently with the rotating.

C19. The method of any of paragraphs C16-C18, wherein the adjusting includes receiving an external input via a/the feed adjustment actuator.

C20. The method of any of paragraphs C16-C19, wherein the adjusting includes adjusting a magnitude of a/the cam follower pivot rate of the adjustable feed mechanism.

C21. The method of paragraph C20, wherein the adjusting the magnitude of the cam follower pivot rate includes adjusting the cam activation angle of the adjustable feed mechanism.

C22. The method of any of paragraphs C16-C21, wherein the adjusting includes reducing a magnitude of the feed rate to zero as the tool head approaches a boundary of the work surface.

C23. The method of any of paragraphs C16-C22, wherein the adjusting includes adjusting a rotational velocity of the rotary element about the central axis.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, when the disclosure, the preceding numbered paragraphs, or subsequently filed claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. An apparatus, comprising:
   an adjustable feed mechanism configured to produce a feed output to translate a tool, the adjustable feed mechanism comprising:
      a plurality of cam segments distributed radially about a central axis, wherein each cam segment includes an inner cam surface, an outer cam surface, and a cam lifter engagement structure, and wherein each cam segment is configured to pivot about a corresponding cam pivot point;
      a cam lifter that contacts the cam lifter engagement structure of each cam segment of the plurality of cam segments; wherein the cam lifter is configured to rotate about the central axis relative to the plurality of cam segments to pivot each cam segment of the plurality of cam segments about the corresponding cam pivot point;
      a cam follower biased toward the cam lifter and configured to revolve about the central axis and to move along the outer cam surfaces of the plurality of cam segments sequentially; and
      a feed output assembly configured to generate the feed output;
   wherein the cam follower is pivotally coupled to the feed output assembly; wherein the cam follower is configured to pivot in a first pivot direction with respect to the feed output assembly when the cam follower moves away from the cam lifter; wherein the cam follower is configured to pivot in a second pivot direction with respect to the feed output assembly when the cam follower moves toward the cam lifter; wherein the second pivot direction is opposite the first pivot direction; wherein the cam follower is configured to pivot in the first pivot direction through a cam activation angle as the cam follower travels along the outer cam surface of a given cam segment of the plurality of cam segments;
   wherein the cam follower is configured to pivot in the second pivot direction through the cam activation angle when the cam follower moves from the given cam segment to an adjacent cam segment; wherein the feed output assembly is configured to produce the feed output to translate the tool responsive to the cam follower pivoting in the first pivot direction; and wherein the adjustable feed mechanism is configured to enable adjustment of a feed rate of the feed output via selective rotation of the cam lifter about the central axis relative to the plurality of cam segments to adjust the cam activation angle while the cam follower revolves about the central axis.

2. The apparatus of claim 1, wherein each cam segment is configured to pivot away from the central axis to increase the cam activation angle when the cam lifter rotates about the central axis in a first adjustment direction, and wherein each cam segment is configured to pivot toward the central axis to decrease the cam activation angle when the cam lifter rotates about the central axis in a second adjustment direction that is opposite the first adjustment direction.

3. The apparatus of claim 1, wherein, as the cam follower travels along the outer cam surface of a given cam segment of the plurality of cam segments, a cam follower pivot angle increases at a cam follower pivot rate, and wherein the feed rate is proportional to a magnitude of the cam follower pivot rate.

4. The apparatus of claim 1, wherein the cam lifter includes a plurality of tangs, wherein each tang engages the cam lifter engagement structure of a corresponding cam segment of the plurality of cam segments to pivot the corresponding cam segment about the cam pivot point of the corresponding cam segment when the cam lifter rotates about the central axis in a first adjustment direction.

5. The apparatus of claim 1, wherein the cam follower is configured to move along each outer cam surface without slipping relative to the outer cam surface.

6. The apparatus of claim 1, further comprising a cam follower pivot arm that pivotally couples the cam follower to the feed output assembly, wherein the cam follower includes a cam follower peripheral portion configured to engage the outer cam surface of each cam segment of the plurality of cam segments and to rotate with respect to the cam follower pivot arm as the cam follower moves along each outer cam surface.

7. The apparatus of claim 1, wherein the plurality of cam segments is configured such that the outer cam surface of each of the plurality of cam segments collectively form a continuous circle when each cam segment of the plurality of cam segments is pivoted to a retracted position, and wherein the adjustable feed mechanism is configured to revolve the cam follower about the central axis without producing the feed output when the plurality of cam segments is pivoted to the retracted position.

8. The apparatus of claim 1, further comprising a circular stop ring, wherein the cam follower is configured to move along the stop ring when the plurality of cam segments is pivoted inwardly of the stop ring, and wherein the adjustable feed mechanism is configured to revolve the cam follower about the central axis without producing the feed output when the cam follower moves along the stop ring.

9. The apparatus of claim 1, further comprising a feed adjustment actuator configured to receive an input to adjust the feed rate, wherein the feed adjustment actuator is configured to rotate the cam lifter about the central axis in either of a first adjustment direction or a second adjustment direction responsive to an external input.

10. The apparatus of claim 1, further comprising:
    a machining assembly, wherein the machining assembly comprises:
       a mount assembly configured to engage a work piece;
       a rotary element configured to rotate with respect to the work piece, wherein the rotary element supports a tool head with the tool for machining a work surface of the work piece; and
       the adjustable feed mechanism, wherein the adjustable feed mechanism is configured to produce the feed output to translate the tool with respect to the rotary element;
    wherein the rotary element is configured to rotate about the central axis; and wherein the tool head is configured to translate with respect to the rotary element responsive to the feed output produced by the adjustable feed mechanism while the rotary element rotates about the central axis.

11. The apparatus of claim 10, wherein the machining assembly is configured to move the tool along a toolpath on the work surface of the work piece that is at least substantially spirally symmetric.

12. The apparatus of claim 10, further comprising at least one of a facer, a flange facer, a boring machine, a lathe, and a mill.

13. The apparatus of claim 10, wherein the mount assembly includes a plurality of legs configured to engage the work piece.

14. The apparatus of claim 10, wherein the work piece includes a pipe with an open volume and an end flange, wherein the mount assembly is configured to extend at least partially within the open volume of the pipe, wherein the end flange includes the work surface, and wherein the machining assembly is configured to at least one of:
 (i) face the end flange;
 (ii) resurface the end flange;
 (iii) level the end flange; and
 (iv) smooth the end flange.

15. The apparatus of claim 10, further comprising a central spindle that is fixedly coupled to the mount assembly, wherein the rotary element is configured to rotate with respect to the central spindle.

16. The apparatus of claim 10, further comprising a motor configured to rotate the rotary element about the central axis, wherein the motor includes at least one of a pneumatic motor and a hydraulic motor, and wherein the motor further includes an inlet configured to receive a working fluid to drive the motor.

17. The apparatus of claim 10, further comprising a counterweight arm extending generally opposite the rotary element, wherein the counterweight arm is configured to at least substantially balance a torque exerted on a remainder of the machining assembly by the rotary element.

18. A method of utilizing the apparatus of claim 10 to machine the work piece, the method comprising:
 engaging the work piece with the mount assembly;
 positioning the tool head with respect to the work surface of the work piece; and
 machining the work surface;
 wherein the machining includes:
  rotating the rotary element about the central axis; and
  translating the tool with respect to the rotary element.

19. The method of claim 18, wherein the engaging includes positioning the mount assembly at least partially within the work piece.

20. The method of claim 19, wherein the translating is performed at least partially concurrently with the rotating.

* * * * *